Patented Nov. 8, 1932

1,887,289

UNITED STATES PATENT OFFICE

ACHILLE CONZETTI, OF BASEL, SWITZERLAND, ASSIGNOR TO THE FIRM J. R. GEIGY S. A., OF BASEL, SWITZERLAND

MANUFACTURE OF STRONGLY BASIC AZODYESTUFFS

No Drawing. Application filed July 28, 1928, Serial No. 296,103, and in Germany August 6, 1927.

The present invention relates to the manufacture of strongly basic azodyestuffs and consists in treating amidated mono- or polyazodyestuffs free from any sulpho group successively with chloracetyl chloride and a tertiary heterocyclic base to convert them into basic dyestuffs containing the group $$-N_A-CO-CH_2-N\equiv B,$$
$$\mid$$
$$X$$

wherein B represents the residue of the strong base, X an acid radical, and A hydrogen, alkyl, aryl or substituted aryl. As tertiary heterocyclic base, preferably pyridine, quinoline, a derivative thereof and the like can be used.

The improved process is illustrated by the following example:

26.3 kilos of the aminated dyestuff, obtained from para-nitraniline red by reduction, or from the dyestuff para-aminoacetanilide + beta-naphthol by saponification, are dissolved in 180 liters of toluene and to the solution, while stirring at 80–85° C. there are added 13 kilos of chloracetylchloride and the whole is then heated for 2 hours at 115° C. On cooling, the chloracetylated dyestuff separates. It is filtered, washed with alcohol, dried and then introduced into 200 kilos of pyridine. The pyridination is produced by a short boiling, whereupon the hydrochloride of the new dyestuff separates in the form of beautiful crystals.

The chloracetylation above referred to takes place according to the following formula:

$$R-NH_2+Cl-CO-CH_2-Cl = R-NH-CO-CH_2-Cl+HCl$$

whilst the pyridination takes place according to the following formula:

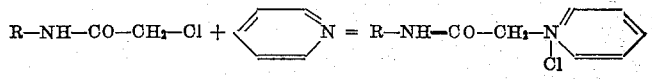

The dyestuff is sparingly soluble in water. It is very freely soluble in dilute acetic acid. It dyes cotton with a tannin mordant a pure red which can be white discharged. It dyes weighted silk a vivid scarlet red of good fastness to washing and water and also fast to light. On leather it is very fast to light.

In this example, any other monoazo- or polyazodyestuff free from sulpho groups and containing one or more amino or aminosubstituted groups, can be used, such as a dyestuff obtained by diazotizing monoacetylbenzidine, coupling with beta-naphthol, saponifying the body thus obtained, chloracetylating and treating with pyridine said body, or a dyestuff obtained by diazotizing metanitraniline, coupling with phenyl-methyl-pyrazolone, reducing the body obtained by sodium sulphide and chloracetylating and treating with pyridine the amino body thus obtained, or a dyestuff obtained by diazotizing aminoazobenzene, coupling with alpha-naphthylamine, chloracetylating and treating with pyridine the amino body thus obtained, and so on.

In all cases, the dyestuffs having thus received a strongly basic character are distinguished by a good fastness to washing and to light, on tannin-mordanted cotton, on weighted silk and other textiles. On leather they give a tint very fast to light.

What I claim is:—

1. A process for the manufacture of strongly basic azodyestuffs, consisting in treating aminated sulpho-free monoazodyes produced from a diazotized benzene compound coupled with a component selected from the group consisting of beta-naphthol, alpha-naphthylamine and phenylmethylpyrazolone, successively with chloracetyl-chloride and pyridine to convert them into basic dyestuffs containing the group

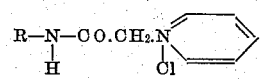

wherein R represents a radical of the benzene or naphthalene series.

2. The herein described strongly basic azodyestuffs, obtained by treating aminated sulpho-free monoazodyes produced from a diazotized benzene compound coupled with a component selected from the group consisting of beta-naphthol, alpha-naphthylamine and phenylmethylpyrazolone, successively with chloracetyl-chloride and pyridine to convert them into basic dyestuffs of the formula

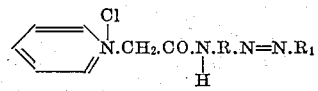

wherein R is a radical of the benzene series and $R_1$ a radical of the naphthalene series, said dyestuffs being difficultly soluble in water, but easily in dilute acetic acid and dyeing tannin-mordanted cotton, weighted silk and leather goods tints fast to washing and light.

In witness whereof I have hereunto signed my name this 16th day of July, 1928.

ACHILLE CONZETTI.